(12) United States Patent
Liuhto et al.

(10) Patent No.: US 7,209,974 B2
(45) Date of Patent: Apr. 24, 2007

(54) SYSTEM AND METHOD FOR MAINTAINING MESSAGE SYNCHRONISM DURING TRANSMISSION OF INTERNAL MESSAGES

(75) Inventors: Anssi Liuhto, Espoo (FI); Mauri Saksio, Espoo (FI)

(73) Assignee: Nokia Corporation, Espoo (FI)

( * ) Notice: Subject to any disclaimer, the term of this patent is extended or adjusted under 35 U.S.C. 154(b) by 173 days.

(21) Appl. No.: 10/615,347

(22) Filed: Jul. 9, 2003

(65) Prior Publication Data

US 2004/0081147 A1  Apr. 29, 2004

Related U.S. Application Data

(63) Continuation of application No. PCT/FI02/00746, filed on Sep. 19, 2002.

(30) Foreign Application Priority Data

Nov. 9, 2001  (FI)  ................................. 20012173

(51) Int. Cl.
  *G06F 15/16*  (2006.01)
(52) U.S. Cl. ...................... 709/236; 709/232; 709/249; 370/252; 370/213
(58) Field of Classification Search ................ 709/236, 709/231, 232, 249, 238, 213, 223; 370/254, 370/252, 213; 714/749
  See application file for complete search history.

(56) References Cited

U.S. PATENT DOCUMENTS

| | | | | |
|---|---|---|---|---|
| 5,086,498 A | * | 2/1992 | Tanaka et al. | 709/236 |
| 5,412,803 A | * | 5/1995 | Bartow et al. | 709/213 |
| 5,430,847 A | | 7/1995 | Bradley et al. | |
| 5,586,263 A | | 12/1996 | Katsumata et al. | |
| 5,592,622 A | | 1/1997 | Isfeld et al. | |
| 5,909,546 A | | 6/1999 | Osborne | |
| 5,931,915 A | * | 8/1999 | Benner et al. | 709/232 |
| 5,982,753 A | * | 11/1999 | Pendleton et al. | 370/252 |
| 6,085,252 A | * | 7/2000 | Zhu et al. | 709/231 |
| 6,118,768 A | * | 9/2000 | Bhatia et al. | 370/254 |
| 6,176,883 B1 | * | 1/2001 | Holloway et al. | 709/223 |
| 6,230,190 B1 | * | 5/2001 | Edmonds et al. | 709/213 |
| 6,353,858 B1 | * | 3/2002 | Raamot et al. | 709/249 |
| 6,453,438 B1 | * | 9/2002 | Miller et al. | 714/749 |
| 6,657,951 B1 | * | 12/2003 | Carroll et al. | 370/222 |
| 6,728,778 B1 | * | 4/2004 | Brennan et al. | 709/238 |

FOREIGN PATENT DOCUMENTS

| | | |
|---|---|---|
| WO | WO 95/24082 | 9/1995 |
| WO | WO 95/24801 | 9/1995 |
| WO | WO 98/31127 | 7/1998 |
| WO | WO 98/56136 | 12/1998 |
| WO | WO 00/19649 | 4/2000 |
| WO | WO 01/16804 A2 | 3/2001 |

* cited by examiner

*Primary Examiner*—William Vaughn
*Assistant Examiner*—Thanh T Nguyen
(74) *Attorney, Agent, or Firm*—Squire, Sanders & Dempsey L.L.P.

(57) ABSTRACT

The present invention concerns a system for transmitting internal messages in a synchronizing local network. The system comprises multiple computer units for running application processes. The system further comprises multiple interface units, each for transmitting an internal message from a sending computer unit to several receiving computer units. According to the invention, the system further comprises multiple external links, each for linking a computer unit to an interface unit. The system further comprises an interconnecting device for receiving messages from sending computer units and forwarding them to receiving computer units one sent message at a time.

21 Claims, 3 Drawing Sheets

SYSTEM AND METHOD FOR MAINTAINING MESSAGE SYNCHRONISM DURING TRANSMISSION OF INTERNAL MESSAGES

This is a Continuation of International Application No. PCT/FI02/00746 filed Sep. 19, 2002, which designated the U.S. and was published under PCT Article 21(2) in English.

BACKGROUND OF THE INVENTION

1. Field of the Invention

The present invention relates to telecommunications. In particular, the present invention relates to a novel and improved system for transmitting internal messages in a local network.

2. Description of the Related Art

Fault tolerant local computer networks are used when high reliability is required. Typical examples are modern telecommunication networks where system downtime must be minimized in order to provide service of acceptable quality. A common way to implement fault tolerance is to use replicated elements in the networks. A network with replicated application processes is a network where each application process is simultaneously running in at least two separate computer units. Thus, if a computer unit running a given application process goes down for whatever reason, there's still at least one more computer unit running the same process.

Message synchronism is one possible way to implement a network with replicated elements. In other words, when a transmitting application process sends a message to a receiving application process, an identical copy of the message is sent to each replicated (or redundant) receiving process running in various computer units. Each replicating receiving process must receive an identical message and in identical order to maintain synchronization of messages. Message synchronism is sometimes also referred to as input synchronism.

A network with message synchronism can be implemented either by software or by hardware. When implemented by software, a special software layer is implemented on top of a standard messaging protocols or technologies such as Ethernet or IP (Internet Protocol, IP). However, software based messaging consumes a substantial amount of computing power and network bandwidth.

Another way to implement a network which takes care of the message synchronism is to use special proprietary hardware, typically a message bus. When a message is sent from one computer unit to another, it is replicated in the message bus hardware. The message bus acts as a serializing point and the message order is preserved.

A typical example of such a hardware based prior art implementation is illustrated in FIG. 1. The system comprises multiple sending computer units CPUs, each for running at least one sending application process for sending an internal message. Since the system in question implements fault tolerance with replicated elements, each message is sent to two or more recipients. The system further comprises multiple receiving computer units CPUr, each for running at least one receiving application process for receiving a sent internal message, at least two copies of each receiving application process residing in said receiving computer units.

The system further comprises one proprietary interface unit IF per one or more computer units for buffering and relaying messages sent to and from the corresponding computer unit. Each interface unit comprises a transmitting buffer TX for storing one or more message to be sent until processed by the internal bus, and a receiving buffer RX for storing one or more received messages until processed by the corresponding computer unit.

The system further comprises multiple internal links, such as e.g. Compact PCI—buses (Peripheral Component Interconnect, PCI), each for linking a computer unit to its corresponding interface unit.

The system further comprises a proprietary external message bus for receiving messages relayed by the interface units corresponding to the sending computer units, and for forwarding each received message to the interface units corresponding to the respective receiving computer units one received message at a time. The external message bus is linked with the interface units. The external message bus is a shared bus, i.e. only one sent message is forwarded by the bus at any given time, thus message synchronization is maintained.

However, there are significant disadvantages with the referenced prior art implementation. When more computing capacity is needed, more computer units are attached to the message bus. Thus a longer message bus is needed. Adding more computer units requires more messaging capacity between the computer units. The physical length of the message bus is limited because it is a shared bus. There is a trade-off between the length of the bus and the speed (bits per second). The higher the speed, the shorter the bus must be. The speed of the bus can be made higher by using more bits in parallel but the physical limits such as connectors and cabling will be reached very soon. Typically, the existing implementations use 8 or 16 bits in parallel.

Thus there is need for a solution overcoming the capacity limitations of the present message bus based implementations of a fault tolerant, high capacity synchronized networks.

Because the functionalities required from the system for providing message synchronism are in direct violation of present related specifications, commercially available solutions, e.g. Ethernet switches are not suitable. This stems from the fact that the specification IEEE802.1D prohibits the switch sending a message back to the same computer unit that the message was received from. Yet such a functionality is required in order to provide message synchronism in all situations. Thus current implementations, such as the one disclosed in FIG. 1, need to use proprietary components in order to achieve the desired functionalities.

Thus there is need for a solution making it possible to implement a system providing message synchronism using non-proprietary components either as-is or with only slight modifications.

SUMMARY OF THE INVENTION

The present invention concerns a system for transmitting internal messages in a local network while maintaining message synchronism. An internal message refers to a message sent from a computer unit in a local network to computer units in the same local network as opposed to traffic to/from external networks such as e.g. Internet. The system comprises multiple sending computer units, each for running at least one sending application process for sending an internal message. The system further comprises multiple receiving computer units, each for running at least one receiving application process for receiving a sent internal message, at least two copies of each receiving application process residing in said receiving computer units. The term receiving application process refers to application processes that for whatever reason are interested in receiving a sent message in identical order. In an embodiment of the present invention the receiving application processes are an application process and its replicated copies. The division of computer units into sending and receiving ones is a functional one, thus a computer unit can simultaneously be both sending and receiving messages. Correspondingly, an application process can simultaneously be both sending and receiving messages. The computer units are physically or logically separate from each other.

According to the invention, the system further comprises one interface unit per one or more computer units for buffering and relaying messages sent to and from the corresponding computer units.

Further according to the invention, the system comprises multiple external links, each for linking a computer unit to its corresponding interface unit. In an embodiment of the invention said external links are fast serial links.

Further according to the invention, the system comprises an internal interconnecting device for receiving messages relayed by the interface units corresponding to the sending computer units, and for forwarding each received message to the interface units corresponding to the respective receiving computer units one received message at a time thus maintaining message synchronism. The interconnecting device is internally coupled with the interface units.

Thus also messages sent and received by application processes running in the same computer unit are routed via the interconnecting device. Since the long and thus relatively slow external message bus of prior art is replaced with a short and extremely fast internal interconnecting device, the overall messaging capacity of the system increases while message synchronization is maintained. Yet, because of external links used between computer units and interface units, distance between the computer units can still be relatively long, i.e. tens of meters.

Another embodiment of the invention concerns a system for transmitting internal messages in a local network while maintaining message synchronism. The system comprises multiple sending computer units, each for running at least one sending application process for sending an internal message. The system further comprises multiple receiving computer units, each for running at least one receiving application process for receiving a sent internal message, at least two copies of each receiving application process residing in said receiving computer units. The computer units are physically or logically separate from each other.

According to this embodiment of the invention, the system comprises multiple multiplexer units, each for collecting messages from and distributing messages to one or more sending computer units.

Further according to this embodiment of the invention, the system further comprises one interface unit per one or more multiplexer units for buffering and relaying messages sent to and from the corresponding multiplexer units. In an embodiment of the invention there may be multiple layers of multiplexer units, thus a multiplexer unit may be connected to the interface unit via another multiplexer unit. By doing so the number of computer units linked to the internal interconnecting device using one interface unit can be increased. At the same time the amount of cabling may be reduced.

Further according to this embodiment of the invention, the system comprises an internal interconnecting device for receiving messages relayed by the interface units corresponding to the sending computer units, and for forwarding each received message to the interface units corresponding to the respective receiving computer units one received message at a time thus maintaining message synchronism. The interconnecting device is internally coupled with the interface units. Because of multiplexers used between computer units and interface units, cabling is reduced significantly.

In an embodiment of the invention each interface unit further comprises a transmitting buffer for storing one or more messages to be sent until processed by the interconnecting device, and a receiving buffer for storing one or more received messages until processed by the corresponding computer or multiplexer unit.

In an embodiment of the invention messages are sent as multicasts by the sending application process. Multicasting can be done e.g. by using group addressing. Group addressing refers to a known addressing method where a group of computer units are assigned a common group address. A message to be sent to computer units of a given group is addressed according to corresponding group address. With two recipients group addressing is commonly referred to as pair addressing.

In an embodiment of the invention the interconnecting device is an internal bus.

In an embodiment of the invention the interconnecting device is a crossbar.

In an embodiment of the invention the interconnecting device, the interface units coupled to it and the multiplexer units are implemented by modifying a standard LAN switch such as an Ethernet switch. Such modifications comprise modifications making it possible to multicast messages back to the same computer unit that the message was received from, as well as modifications required to make the interconnecting device act as a serializing point.

The invention makes it possible to overcome the capacity limitations of the present external message bus based proprietary implementations of a fault tolerant, high capacity synchronized networks. Significantly higher messaging capacity can be achieved than with existing implementations while at the same time maintaining the message synchronization required by the fault tolerant, high capacity synchronized networks. Additionally, the invention makes it possible to implement a system providing message synchronism using non-proprietary components either as-is or with only slight modifications. The system can be implemented e.g. by only slightly modifying already existing LAN switches.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE PREFERRED EMBODIMENTS

Reference will now be made in detail to the embodiments of the present invention, examples of which are illustrated in the accompanying drawings.

Figure 1:
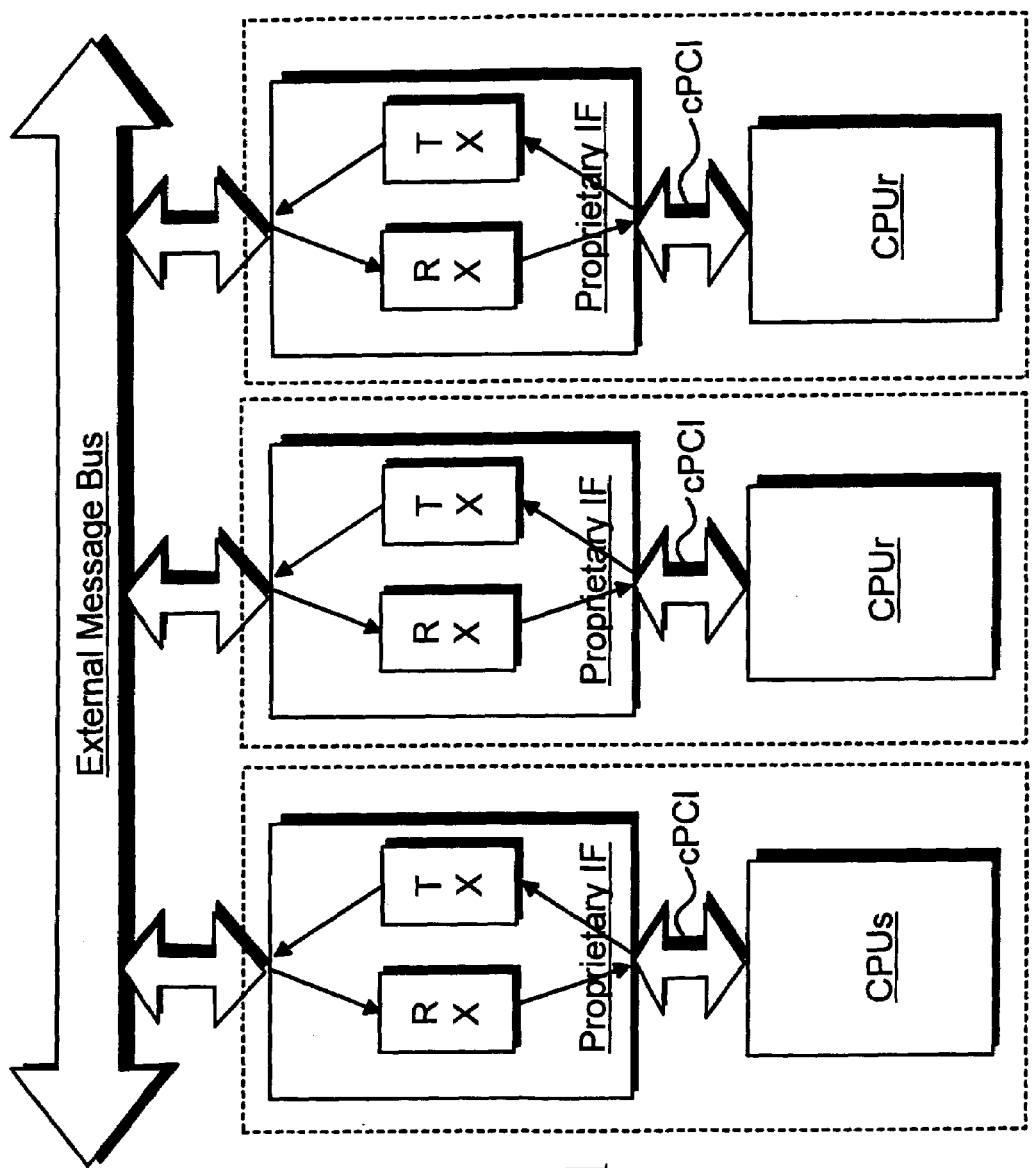
FIG. 1 is a block diagram illustrating a prior art system.
Figure 2:
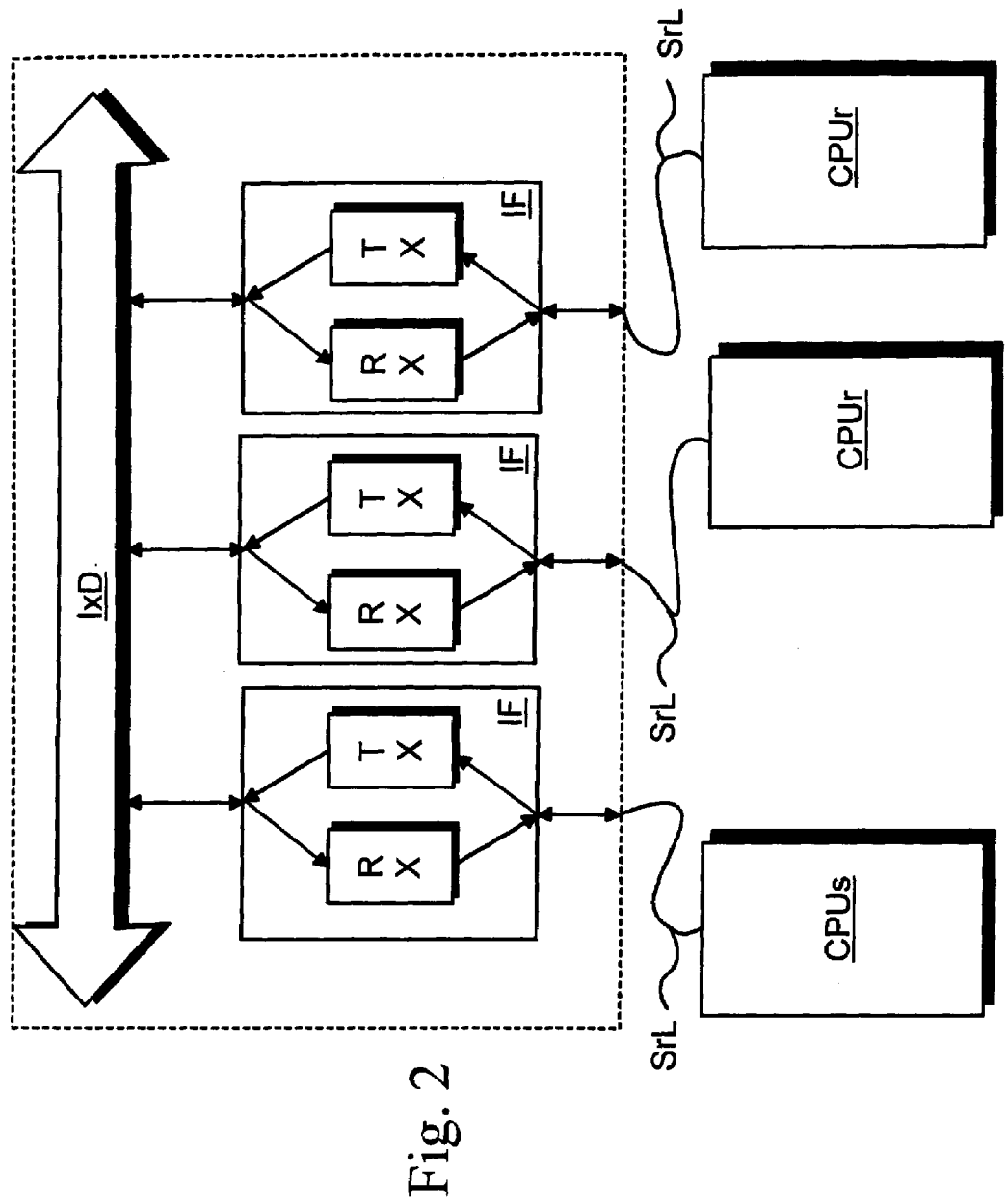
FIG. 2 is a block diagram illustrating a system according to one embodiment of the present invention.

FIG. 2 illustrates a system for transmitting internal messages in a local network while maintaining message synchronism. The system comprises multiple sending computer units CPUs (only one of which is disclosed in FIG. 2), each for running at least one sending application process for sending an internal message. The system further comprises multiple receiving computer units CPUr, each for running at least one receiving application process for receiving a sent internal message, at least two copies of each receiving application process residing in said receiving computer units. Application processes are elements performing information processing for a given application.

The system illustrated in FIG. 2 further comprises one interface unit IF per one or more computer units for buffering and relaying messages sent to and from the corresponding computer units. In the embodiment of the invention illustrated in FIG. 2 messages are sent as multicasts by the sending application process. Each interface unit IF further comprises a transmitting buffer TX for storing one or more messages to be sent until processed by the interconnecting device, and a receiving buffer RX for storing one or more received messages until processed by the corresponding computer unit. Preferably the buffers are FIFO (First In-First Out) buffers.

The system illustrated in FIG. 2 further comprises multiple external links SrL, each for linking a computer unit to its corresponding interface unit. In the embodiment of the invention illustrated in FIG. 2 said external links are fast serial links.

The system illustrated in FIG. 2 further comprises an internal interconnecting device IxD for receiving messages relayed by the interface units corresponding to the sending computer units, and for forwarding each received message to the interface units corresponding to the respective receiving computer units one received message at a time thus maintaining message synchronism. The interconnecting device is internally coupled with the interface units. In the embodiment of the invention illustrated in FIG. 2 said interconnecting device is an internal message bus. However, the interconnecting device can also be implemented e.g. as a crossbar or as some other internal bus arrangement known to a person skilled in the art. Messages sent and received by application processes running in the same computer unit are also routed via the internal bus.

Figure 3:
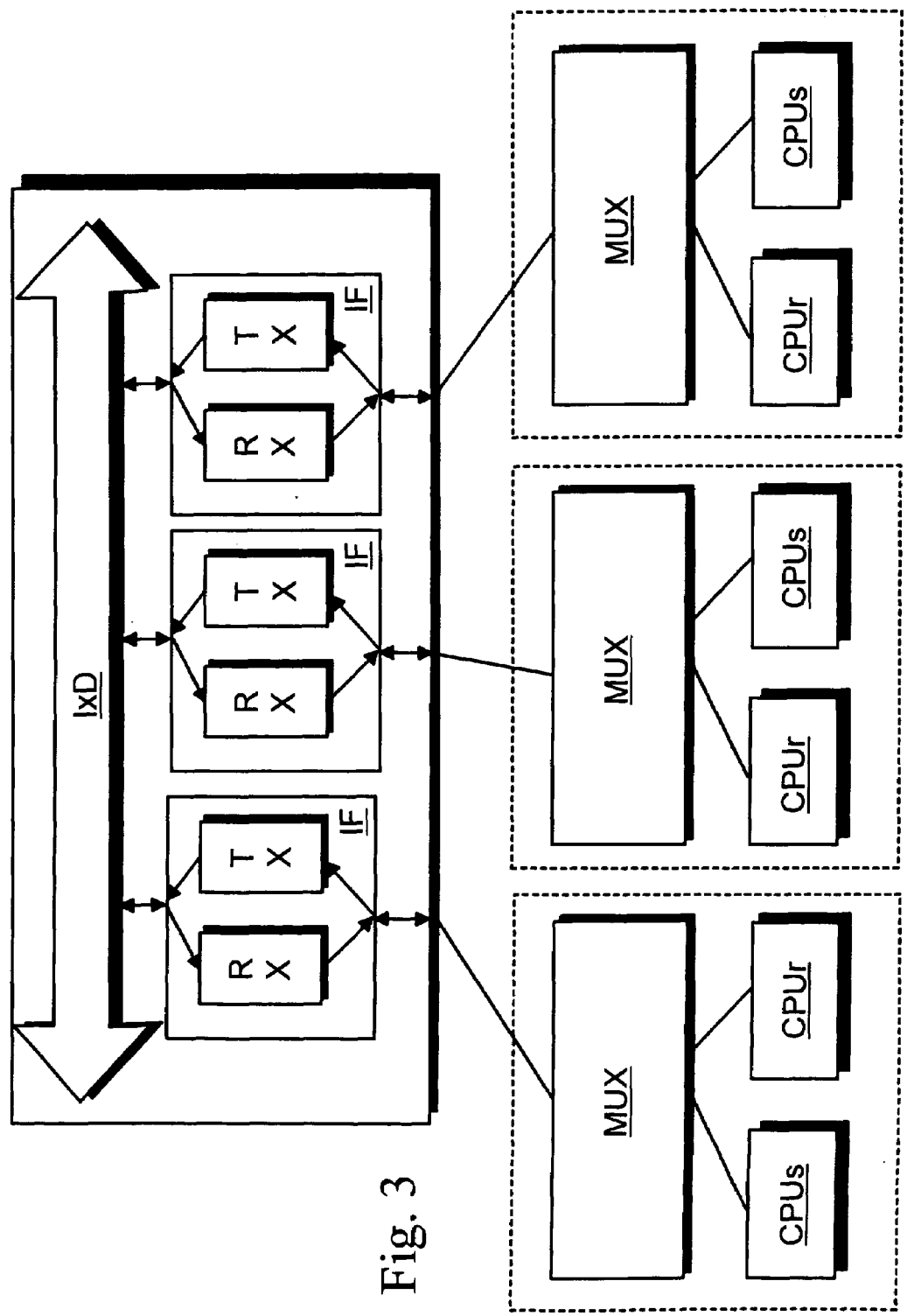
FIG. 3 is a block diagram illustrating a system according to another embodiment of the present invention.

FIG. 3 illustrates a system for transmitting internal messages in a local network while maintaining message synchronism. The system comprises multiple sending computer units CPUs, each for running at least one sending application process for sending an internal message. The system further comprises multiple receiving computer units CPUr, each for running at least one receiving application process for receiving a sent internal message, at least two copies of each receiving application process residing in said receiving computer units. Application processes are elements performing information processing for a given application.

The system illustrated in FIG. 3 further comprises multiple multiplexer units MUX, each for collecting messages from and distributing messages to one or more sending computer units. The multiplexers collect traffic and messages from one or more computer units and deliver them to the internal interconnecting device via the interface units. The multiplexers are used to reduce cabling and the number of interfaces or ports in the interface units and the interconnecting device. The multiplexers may be implemented so that they pass all the traffic from computer units to interface units. Additionally the multiplexers can be implemented so that unicast messages sent to the computer units residing in the area of the same multiplexer are directed to the correct computer units. However in case of multicast messages, if any of the addressed computer units or application processes is not residing in the area of said multiplexer, the message is directed to the right addresses via the interface units and the interconnecting device. Otherwise the message synchronism can not be maintained. In the embodiment of the invention illustrated in FIG. 3 there is one layer of multiplexer units. However, the invention can also be implemented with multiple layers of multiplexer units.

The system illustrated in FIG. 3 further comprises one interface unit IF per one or more multiplexer units for buffering and relaying messages sent to and from the corresponding multiplexer units. In the embodiment of the invention illustrated in FIG. 3 messages are sent as multicasts by the sending application process. Each interface unit IF further comprises a transmitting buffer TX for storing one or more messages to be sent until processed by the interconnecting device, and a receiving buffer RX for storing one or more received messages until processed by the corresponding multiplexer unit. Preferably the buffers are FIFO (First In-First Out) buffers.

The system illustrated in FIG. 3 further comprises an internal interconnecting device IxD for receiving messages relayed by the interface units corresponding to the sending computer units, and for forwarding each received message to the interface units corresponding to the respective receiving computer units one received message at a time thus maintaining message synchronism. The interconnecting device is internally coupled with the interface units. In the embodiment of the invention illustrated in FIG. 3 said interconnecting device is an internal message bus. However, the interconnecting device can also be implemented e.g. as a crossbar or as some other internal bus arrangement known to a person skilled in the art. Messages sent and received by application processes running in the same computer unit are also routed via the internal bus.

It is obvious to a person skilled in the art that with the advancement of technology, the basic idea of the invention may be implemented in various ways. The invention and its embodiments are thus not limited to the examples described above, instead they may vary within the scope of the claims.

The invention claimed is:

1. A system, comprising:
   multiple sending computer units, each for running at least one sending application process for sending an internal message; and
   multiple computer units, each for running at least one receiving application process for receiving a sent internal message; each receiving application process having at least one replicated copy residing in at least one of said multiple receiving computer units, wherein when sending the internal message from a sending application process to an intended receiving application process, said sending application process is arranged to send an identical copy of said internal message to at least one replicated copy of said intended receiving application process;
   one interface unit per one or more computer units for buffering and relaying internal messages sent to and from the corresponding computer units;
   multiple external links, each for linking a computer unit to its corresponding interface unit; and
   an internal interconnecting device for receiving internal messages relayed by the interface units corresponding to the sending computer units, and for forwarding each received internal message to the interface units corresponding to the respective receiving computer units one received internal message at a time, said interconnecting device internally coupled with the interface units, wherein at least one of said interface units, at least one of said external links and said internal interconnecting device are arranged to forward said identical copy of said internal message, sent by said sending application process, to said intended receiving application process and to each replicated copy of said intended receiving application process for receipt in identical order, and wherein at least one of said interface units, at least one of said external links and said internal interconnecting device are arranged to route an internal message sent by a sending application process to a receiving application process running in a same computer unit via said interconnecting device.

2. The system according to claim 1, wherein each interface unit further comprises:

a transmitting buffer for storing one or more message to be sent until processed by the interconnecting device, and a receiving buffer for storing one or more received messages until processed by the corresponding computer unit.

3. The system according to claim 1, wherein messages are sent as multicasts by the sending application process.

4. The system according to claim 1, wherein the interconnecting device is an internal bus.

5. The system according to claim 1, wherein the interconnecting device is a crossbar.

6. The system according to claim 1, wherein the interconnecting device and the interface units coupled to it are implemented as a modified LAN switch.

7. The method according to claim 6, further comprising:
storing one or more message to be sent until processed by the interconnecting device, and storing one or more received messages until processed by the corresponding computer unit.

8. The method according to claim 6, further comprising sending messages as multicasts by the sending application process.

9. A system, comprising:

multiple sending computer units each for running at least one sending application process for sending an internal message;

multiple computer units, each for running at least one receiving application process for receiving a sent internal message each receiving application process having at least one replicated copy residing in at least one of said multiple receiving computer units, wherein when sending the internal message from a sending application process to an intended receiving application process, said sending application process is arranged to send by using group addressing an identical copy of said internal message to at least one replicated copy of said intended receiving application process;

multiple multiplexer units, each for collecting internal messages from and distributing internal messages to one or more sending computer units;

one interface unit per one or more multiplexer units for buffering and relaying internal messages sent to and from the corresponding multiplexer units; and an internal interconnecting device for receiving internal messages relayed by the interface units corresponding to the sending computer units, and for forwarding each received internal message to the interface units corresponding to the respective receiving computer units one received internal message at a time, said interconnecting device internally coupled with the interface units, wherein at least one of said interface units, at least one of said multiplexer units and said internal interconnecting device are arranged to forward said identical copy of said internal message, sent by said sending application process, to said intended receiving application process and to each replicated copy of said intended receiving application process for receipt in identical order, and wherein at least one of said interface units, at least one of said multiplexer units and said internal interconnecting device are arranged to route an internal message sent by a sending application process to a receiving application process running in a same computer unit via said interconnecting device.

10. The system according to claim 9, wherein each interface unit further comprises:

a transmitting buffer for storing one or more message to be sent until processed by the interconnecting device, and a receiving buffer for storing one or more received messages until processed by the corresponding multiplexer unit.

11. The system according to claim 9, wherein messages are sent as multicasts by the sending application process.

12. The system according to claim 9, wherein the interconnecting device is an internal bus.

13. The system according to claim 9, wherein the interconnecting device is a crossbar.

14. The system according to claim 9, wherein the interconnecting device, the interface units coupled to it and the multiplexer units are implemented as modified LAN switches.

15. The method according to claim 14, further comprising:

storing one or more message to be sent until processed by the interconnecting device, and storing one or more received messages until processed by the corresponding multiplexer unit.

16. The method according to claim 14, further comprising sending messages as multicasts by the sending application process.

17. The system according to claim 9, wherein a multiplexer unit is connected to an interface unit via another multiplexer unit.

18. A method, comprising:

sending an internal message from a sending application process of one of multiple sending computer units to an intended receiving application process of one of multiple receiving computer units, each receiving application process having at least one replicated copy residing in at least one of said multiple receiving computer units and said sending application process is arranged to send an identical copy of said internal message to at least one replicated copy of said intended receiving application process;

arranging at least one of multiple interface units, at least one of multiple external links, and an interconnecting device, internally coupled, to forward said identical copy of said internal message sent by said sending application process to said intended receiving application process and to each replicated copy of said intended receiving application process for receipt in identical order, wherein one of said interface units per one or more computer units is provided for buffering and relaying internal messages sent to and from the corresponding computer units, each of the multiple external links is provided for linking a computer unit to its corresponding interface unit, and said internal interconnecting device is provided for receiving internal messages relayed by the interface units corresponding to the sending computer units and for forwarding each received internal message to the interface units corresponding to the respective receiving computer units one received internal message at a time, said interconnecting device internally coupled with the interface units; and arranging at least one of said interface units, at least one of said external links and said internal interconnecting device to route an internal message sent by a sending application process to a receiving application process running in a same computer unit via said interconnecting device.

19. A method, comprising:

sending an internal message from a sending application process of one of multiple sending computer units to an intended receiving application process of one of multiple receiving computer units, each receiving application process having at least one replicated copy residing in at least one of said multiple receiving computer units and said sending application process is arranged to send by using group addressing an identical copy of said internal message to at least one replicated copy of said intended receiving application process;

arranging at least interface unit, at least one multiplexer unit and an internal interconnecting device to forward said identical copy of said internal message, sent by said sending application process, to said intended receiving application process and to each replicated copy of said intended receiving application process for receipt in identical order, where multiple multiplexer units are provided for collecting internal messages from and distributing internal messages to one or more sending computer units, one interface unit per one or more multiplexer units is provided for buffering and relaying internal messages sent to and from the corresponding multiplexer units, and the internal interconnecting device is provided for receiving internal messages relayed by the interface units corresponding to the sending computer units and for forwarding each received internal message to the interface units corresponding to the respective receiving computer units one received internal message at a time, said interconnecting device internally coupled with the interface units; and arranging at least one of said interface units, at least one of said multiplexer units and said internal interconnecting device to route an internal message sent by a sending application process to a receiving application process running in a same computer unit via said interconnecting device.

20. A apparatus, comprising:

sending means for sending an internal message from a sending application process of one of multiple sending computer units to an intended receiving application process of one of multiple receiving computer units, each receiving application process having at least one replicated copy residing in at least one of said multiple receiving computer units and said sending application process is arranged to send an identical copy of said internal message to at least one replicated copy of said intended receiving application process;

arranging means for arranging at least one of multiple interface units, at least one of multiple external links,
and an interconnecting device, internally coupled, to forward said identical copy of said internal message sent by said sending application process to said intended receiving application process and to each replicated copy of said intended receiving application process for receipt in identical order, wherein one of said interface units per one or more computer units is provided for buffering and relaying internal messages sent to and from the corresponding computer units, each of the multiple external links is provided for linking a computer unit to its corresponding interface unit, and said internal interconnecting device is provided for receiving internal messages relayed by the interface units corresponding to the sending computer units and for forwarding each received internal message to the interface units corresponding to the respective receiving computer units one received internal message at a time, said interconnecting device internally coupled with the interface units; and arranging means for arranging at least one of said interface units, at least one of said external links and said internal interconnecting device to route an internal message sent by a sending application process to a receiving application process running in a same computer unit via said interconnecting device.

21. An apparatus, comprising:

sending means for sending an internal message from a sending application process of one of multiple sending computer units to an intended receiving application process of one of multiple receiving computer units, each receiving application process having at least one replicated copy residing in at least one of said multiple receiving computer units and said sending application process is arranged to send by using group addressing an identical copy of said internal message to at least one replicated copy of said intended receiving application process;

arranging means for arranging at least interface unit, at least one multiplexer unit and an internal interconnecting device to forward said identical copy of said internal message, sent by said sending application process, to said intended receiving application process and to each replicated copy of said intended receiving application process for receipt in identical order, where multiple multiplexer units are provided for collecting internal messages from and distributing internal messages to one or more sending computer units, one interface unit per one or more multiplexer units is provided for buffering and relaying internal messages sent to and from the corresponding multiplexer units, and the internal interconnecting device is provided for receiving internal messages relayed by the interface units corresponding to the sending computer units and for forwarding each received internal message to the interface units corresponding to the respective receiving computer units one received internal message at a time, said interconnecting device internally coupled with the interface units; and arranging means for arranging at least one of said interface units, at least one of said multiplexer units and said internal interconnecting device to route an internal message sent by a sending application process to a receiving application process running in a same computer unit via said interconnecting device.

* * * * *